United States Patent
Tarragona et al.

(10) Patent No.: US 9,102,060 B2
(45) Date of Patent: Aug. 11, 2015

(54) METHOD AND DEVICE FOR CONTROLLING A MULTIPLE-MACHINE ARRANGEMENT

(75) Inventors: Christian Tarragona, Augsburg (DE); Eiko Allmann, Augsburg (DE)

(73) Assignee: Kuka Roboter GmbH, Augsburg (DE)

( * ) Notice: Subject to any disclaimer, the term of this patent is extended or adjusted under 35 U.S.C. 154(b) by 304 days.

(21) Appl. No.: 12/911,020

(22) Filed: Oct. 25, 2010

(65) Prior Publication Data
US 2011/0098854 A1   Apr. 28, 2011

(30) Foreign Application Priority Data
Oct. 26, 2009   (DE) .......................... 10 2009 050 646

(51) Int. Cl.
G06F 19/00   (2011.01)
B25J 9/16   (2006.01)
G05B 19/418   (2006.01)

(52) U.S. Cl.
CPC ......... *B25J 9/1656* (2013.01); *G05B 19/41835* (2013.01)

(58) Field of Classification Search
CPC combination set(s) only.
See application file for complete search history.

(56) References Cited

U.S. PATENT DOCUMENTS

| | | | |
|---|---|---|---|
| 4,894,908 A * | 1/1990 | Haba et al. ....................... 29/711 |
| 6,055,632 A | 4/2000 | Deegan et al. |
| 6,594,550 B1 * | 7/2003 | Okrah ........................... 700/245 |
| 6,804,580 B1 * | 10/2004 | Stoddard et al. .............. 700/248 |
| 6,807,461 B2 * | 10/2004 | Kneifel et al. ................. 700/248 |
| 7,313,609 B1 | 12/2007 | Wischinski |
| 7,516,367 B1 | 4/2009 | Beltowski et al. |
| 7,567,984 B1 | 7/2009 | Todd |
| 7,650,205 B2 * | 1/2010 | Calcagno ....................... 700/264 |
| 7,783,387 B2 * | 8/2010 | Calcagno ....................... 700/264 |
| 8,073,567 B2 * | 12/2011 | Nishi et al. .................... 700/247 |
| 8,200,796 B1 * | 6/2012 | Margulis ........................ 709/223 |
| 8,793,018 B2 * | 7/2014 | Muller .......................... 700/247 |
| 2001/0004718 A1 * | 6/2001 | Gilliland et al. .............. 700/255 |
| 2002/0023177 A1 | 2/2002 | Dobbek |
| 2003/0009754 A1 | 1/2003 | Rowley et al. |
| 2003/0070025 A1 * | 4/2003 | Watts et al. .................... 710/305 |
| 2004/0060044 A1 | 3/2004 | Das et al. |
| 2004/0210653 A1 | 10/2004 | Kanoor et al. |
| 2004/0243995 A1 | 12/2004 | Sheehy |
| 2006/0271209 A1 * | 11/2006 | Calcagno ......................... 700/19 |
| 2008/0114492 A1 * | 5/2008 | Miegel et al. ................. 700/248 |
| 2008/0263628 A1 * | 10/2008 | Norman et al. .................... 726/1 |
| 2009/0144730 A1 | 6/2009 | Chen et al. |
| 2009/0198370 A1 * | 8/2009 | Nishi et al. .................... 700/184 |
| 2010/0017033 A1 * | 1/2010 | Boca .............................. 700/258 |
| 2010/0063625 A1 * | 3/2010 | Krause et al. ................. 700/245 |
| 2010/0325623 A1 * | 12/2010 | Ikeda ............................ 717/173 |

FOREIGN PATENT DOCUMENTS

DE   102008004923 A1   7/2009

* cited by examiner

Primary Examiner — Jonathan L Sample
(74) Attorney, Agent, or Firm — Schiff Hardin LLP

(57) ABSTRACT

In a method and device to control a multiple-machine arrangement with at least one first controller and one second controller, specific data packages for the controllers are generated, these specific data packages are transferred to the controllers, the transferred data packages are selectively activated, and downloading of the data packages is implemented in the controllers as a result of an activation, in particular installation of at least one program and/or one configuration file.

20 Claims, 2 Drawing Sheets

METHOD AND DEVICE FOR CONTROLLING A MULTIPLE-MACHINE ARRANGEMENT

BACKGROUND OF THE INVENTION

1. Field of the Invention

The present invention concerns a method and a device for controlling a multiple-machine arrangement with multiple controllers, in particular an automation cell with two or more industrial robots.

2. Description of the Prior Art

In automation cells—for example production cells such as welding, enameling or installation cells—very dissimilar machines—for example robots, tool machines, conveyors and the like—are frequently used by different manufacturers, and even machines of the same type can still differ, for example by the type and/or the version of their controller.

This makes it difficult to implement new projects in such heterogeneous automation cells, which projects in particular require different programs and configuration data for the different controllers.

A control system, method and computer program are known from EP 1 738 235 B1, in which a robot controller sends information to a human-machine interface so that the correct version of a robot program is used at this interface. The controller of heterogeneous multiple-machine arrangements does not satisfactorily facilitate this procedure. Conversely, software distribution programs—known as deployment applications—for installation of new programs on client computers have previously only been known in the field of office applications.

SUMMARY OF THE INVENTION

It is an object of the present invention to improve the control of a multiple-machine arrangement with multiple controllers, in particular of an automation cell with two or more industrial robots.

According to the invention, a deployment (advantageously an essentially simultaneous deployment) of programs to controllers of a multiple-machine arrangement is implemented. The invention is particularly advantageously used in heterogeneous installations with different systems or systems of varying types, wherein a system includes one or more controllers and/or machines, in particular industrial robots.

A multiple-machine arrangement in the sense of the present invention accordingly has two or more machines, of which at least one machine is advantageously an industrial robot or includes an industrial robot. At least one controller that can be fashioned, for example, as a PC-based controller and/or memory-programmable controller (SPS, also called a "Programmable Logic Controller" or PLC) is associated with each machine. One controller can be provided for one or more of its associated machines, or multiple controllers can be provided for one machine associated with the multiple controllers together. In a heterogeneous installation, at least two controllers and/or two controller machines differ from one another, for example in their structure.

To distribute an automation solution for a project—for example the enameling of a new vehicle type by different enameling robots—specific data packages for controllers participating in this project are initially generated according to the invention.

A data or deployment package (advantageously in a compressed data form) can contain one or more working programs for one or more controllers of the target system for which it is specified that one or more installation programs contain configuration data and/or other data, for example, machine or process data or parameters. A specific project and/or a specific project version can be specified or, respectively, individualized, in particular for a specific controller and/or a specific machine. This advantageously respectively ensues through a controller-specific or system type-specific generator, i.e. a generator is provided for each controller type or system type. A data package advantageously has unambiguous identification features of the target system, in particular the target controller, the target project and/or the target project version. For example, a generator for a PC-based controller of a six-axis industrial robot for the use of the robot to enamel a first car body type can generate a data package specific to this project version; for the enameling of a second car body type said generator can generate a different data package specific to this different version of the "car body enameling" project; and for the use of the robot for welding the generator can generate an additional data package specific to this different project.

These specific data packages are transferred to the controllers. This ensues essentially in parallel, in particular via a network such as Ethernet and/or via a central planning device, in particular a computer (advantageously a portable computer or, respectively, a notebook).

If a data package cannot be directly transferred to a target system, a communication interface—in particular a proxy—can be provided that relays data between a controller and the planning device or the network.

In a preferred embodiment, a target system—in particular its controller—checks a transferred data package as to whether the data package is designated for the target system. For example, for this unique identification, features of the target system (mentioned above) can be compared with those of the data package. In particular it can be checked whether an identity (advantageously an identity that is unique in the entire world) of the system or, respectively, the controller, apparatus type and/or apparatus version agree, whether required subsystems and/or peripheral apparatuses are present and/or possess the required kinematics and/or system extensions (for example technology packages).

The transferred data package is advantageously stored by the controller of the target system.

According to the invention, transferred data packages are selectively activated. This enables a project to be activated in parallel at all target systems. Like the generation and/or transfer of the data packages, the activation of the target systems or their controllers can also ensue via a central planning device. For example, the activation can ensue selectively by, in an activation, information being transmitted that identifies target systems to be activated, the project (in particular an identification specific to this project) and/or a version of the project that should be activated.

The activation can advantageously take place in three phases that are explained separately in the following, wherein phases can also be omitted or executed together, for example.

In a preparation phase, as a result of an activation target systems—in particular their controllers—can check whether an activation-specific data package is present, for example a data package whose project ID and project version agree with those specified in the activation, i.e. can check whether a deployment package is available for the project to be activated. It is additionally or alternatively checked whether this data package is specified for this target system or this controller, and/or whether the target system or, respectively, the controller and/or a machine controlled by it allows an activation. In particular, it can be checked whether the system state—for instance robot pose, power supply state, drive state and/or controller state—allows the specific activation.

Additionally or alternatively, controllers and/or machines can be transitioned into a predetermined state as a result of the activation. For example, as a result of the activation a robot can be halted in a predetermined pose (advantageously the home pose) at the end of a production cycle and its previously executed work program can be deselected.

Notification of a successful and/or an unsuccessful preparation phase is advantageously sent back, for example to the planning device. Before initiating an installation phase (explained in the following), this planning device can thus ensure that all required deployment packages are present and the target systems are ready for their installation. In a preferred embodiment, the activation is terminated if at least one essential target system does not return notification of a successful preparation phase. Instead of this, the previous system state is retained without changes.

According to the invention, in an installation phase data of the data package are implemented in the controller as a result of the activation; in particular, work and/or installation programs are installed and/or configuration data are updated. For example, a new work program is loaded into the controller of a robot and the configuration files required for this (that can contain machine and/or process data, for example) are applied or adapted.

State data of system components (for example the controller) are advantageously stored beforehand in order to reverse the activation if necessary.

Additionally or alternatively, controllers and/or machines can execute additional predetermined actions as a result of the activation, for example a (re)initialization (in particular an IO re-initialization), a system restart, a (re)calibration or the like.

In a preferred embodiment, notification of a successful and/or an unsuccessful installation phase is sent back in turn, for example to the planning device. Before initiating a start phase (explained in the following), this can thus ensure that all required data packages are implemented. In a preferred embodiment, the activation is terminated if at least one essential target system does not return notification of a successful installation phase. The old system state can then be reestablished (what is known as a "rollback") on the basis of the state data stored before the implementation. Given a successful installation phase, these old state data that are no longer necessary are erased (successful "rollout").

For this purpose, controllers can be informed about the result of the activation of other controllers or, respectively, the entire system, advantageously via the planning device.

In a subsequent start phase, as a result of the activation target systems—in particular their controllers—can start one or, respectively, more programs installed in the installation phase. If the multiple-machine arrangement or, respectively, the automation cell is already found in an automation mode, a drive (movement) release can immediately ensue so that the machines continue their work process.

In order to simplify and consolidate the implementation of the programs or, respectively, data in the distributed, heterogeneous target systems or, respectively, controllers, in a preferred embodiment a structure of the multiple-machine arrangement (in particular its controllers) can be defined in a central project. This can ensue largely independent of the concrete properties of the target systems. For example, the structure can contain that a six-axis robot with specific bearing loads and ranges is provided. This is independent of its concrete design or the realization of its controller. This is taken into account via the use of the controller-specific or, respectively, system-specific generator.

As explained in the preceding, the activation advantageously ensues centrally and/or essentially simultaneously. Inconsistent states of the multiple-machine arrangement or, respectively, an automation cell in which a robot controller (for example) already executes a new work program but a different robot controller is still executing an old work program, and thus can cause a collision of the two robots, can thus advantageously be avoided.

As explained in the preceding, an in particular central planning device (in particular a computer) automatically implements the activation and monitors this.

DESCRIPTION OF THE PREFERRED EMBODIMENTS

Figure 1:
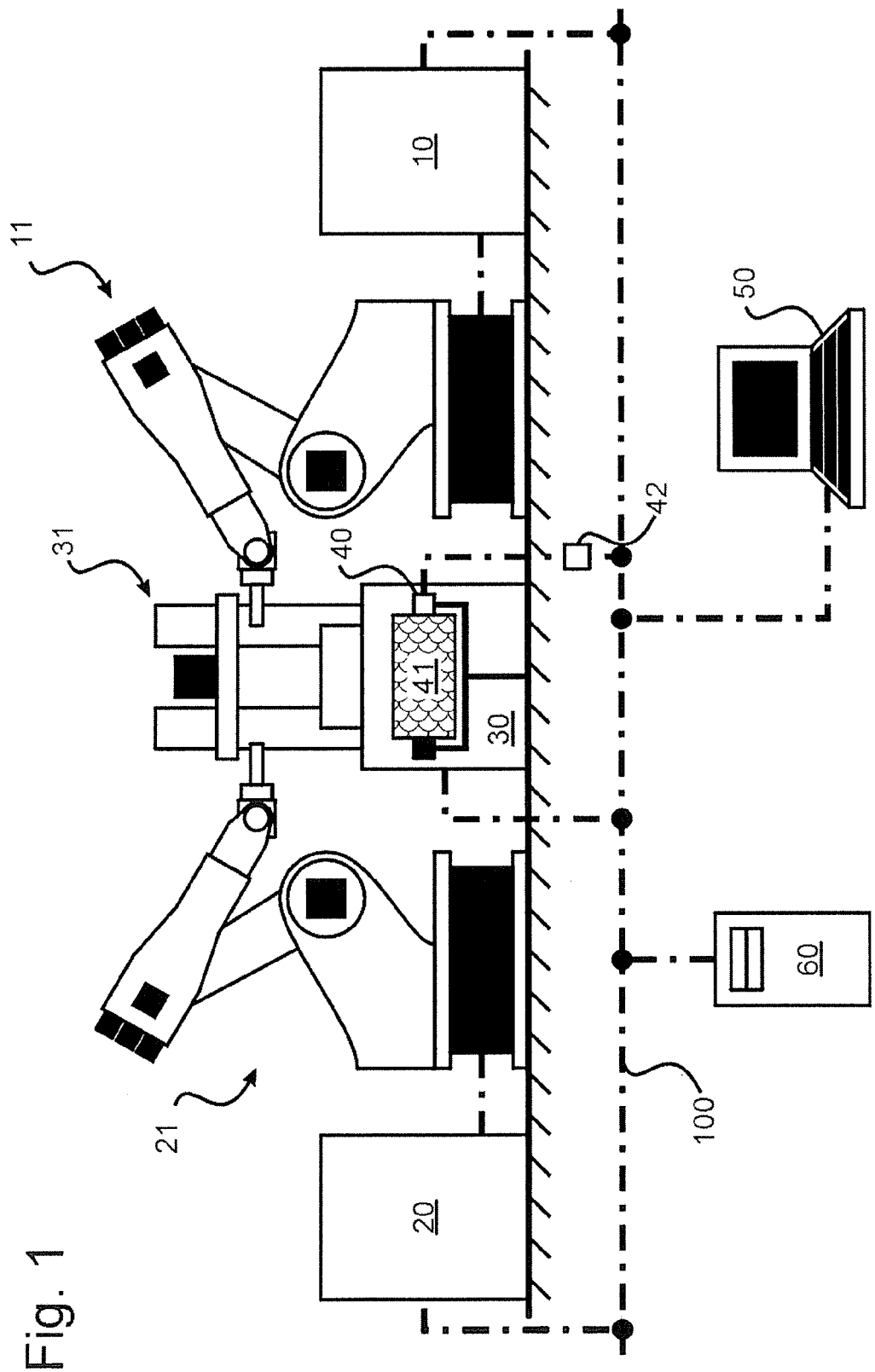
FIG. 1 shows a multiple-machine arrangement with a device to control according to an embodiment of the present invention.

FIG. 1 shows an automation cell or multiple-machine arrangement with two six-axis industrial robots 11, 21 and their respective PC-based robot controllers 10 and 20. The industrial robots 11, 21 insert tools (not shown) into a press 31 with an SPS 30, or remove tools from the press 31 and place them on a conveyor 41 with an SPS 40.

The robot controllers 10, 20 and the press SPS 30 are directly linked with an Ethernet network 100 (indicated with a dash-dot line in FIG. 1); the conveyor SPS 40 is indirectly linked with said Ethernet network 100 via a proxy 42. A notebook 50 and a backup server 60 in which data (for example state data of the controllers 10, . . . , 40 can be stored) additionally communicate with this network.

Figure 2:
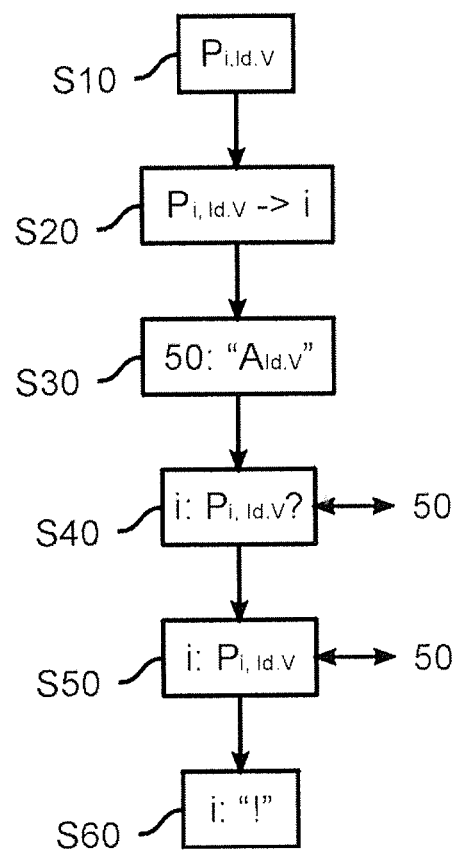
FIG. 2 shows the workflow of a method executed by the device of FIG. 1 according to an embodiment of the present invention.

In order to now implement a new project (for example the processing of different work pieces) or a new project version (for example with modified, optimized workflows) in this heterogeneous automation cell, in a first step S10 (see FIG. 2) the planning device 50 generates for each controller 10, . . . , 40 a data or deployment package $P_{i,Id,V}$, i=10, . . . , 40 specific to this project (characterized by a unique identification "Id" and to this project version (characterized by a unique identification "V"). For this purpose, type-specific generators are implemented (not shown) in the computer 50 that, for example package the necessary work programs and configuration files for the SPS 30 or the robot controller 10. For example, if robots 11, 21 and controllers 10, 20 are similar, the same generator can generate data specific to these.

In a next step S20 the planning device 50 sends the corresponding data packages in parallel to all cell participants 10, . . . , 42 via Ethernet 100. A sequential execution with small time intervals is thereby also to be understood as "parallel" in the sense of the present invention. The new project or the new project version can subsequently be activated.

For this computer 50 sends a corresponding activation signal $A_{i,Id,V}$ to the individual receivers 10, . . . , 42 that uniquely identify the project ID to be activated and its version .V (step 30). Alternatively, an activation signal specifying only the project ID to be activated and its version .V can be sent, and it is left to the individual target systems to check whether they are participating in this.

In a preparation phase (S40), the target systems check whether a corresponding deployment package is present and it is determined whether its system state allows an activation.

If necessary the target system then brings itself into a predetermined state. For example, if the activation signal is sent during the production cycle, this is initially executed before the controllers 10, 20, 30 halt the robots 11, 21 or the press 31 in a home position and disenables their previous work program. The individual controllers report success or lack of success of the preparation phase to the central planning device 50 which, given a lack of success of even only one subsystem, stops the further implementation of the project and outputs an error message to the user.

The planning device 50 informs the target systems about the success of the preparation phase. If this was successful overall, the controllers 10, . . . , 40 implement data from their deployment packages. In particular, installation programs are called, work programs are installed and/or configuration files are imported (S50). The previous states of the controllers 10, . . . , 40 are advantageously stored in an imaging process (for example stored in the backup server 60). Additional predetermined actions—for example re-initializations of the input/output units (IO re-initialization) or system restarts are additionally implemented.

The individual controllers also report success or, respectively, lack of success of this installation phase to the central planning device which, given a lack of success of even only one subsystem, stops the further implementation of the project, outputs an error message to the user and reestablishes (insofar as it is possible) the old overall system state by reverting to the old state data stored in the backup server 60. In contrast to this, these old state data can be erased given a successful installation phase. In an alternative embodiment, such state data can naturally also be directly stored in the controllers 10, . . . , 40 instead of in the backup server 60.

The planning device 50 in turn informs the target systems about the success of the installation phase (S50). If the new work programs and configuration files are implemented at all target controllers 10, . . . , 40, and if the machines 11, . . . , 41 are located in the predetermined states (for example home poses) the target controllers 10, . . . , 40 start the new work programs (step S60). If the automation cells are in automatic mode, a drive release can take place immediately and the production with new project or, respectively, the new project version can be continued.

Inconsistent system states can be largely avoided via the coordination and checking of the implementation by the central planning device 50. Moreover, the present invention enables the fast, safe and automated distribution of automation solutions in heterogeneous systems as shown in the exemplary embodiment.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method to control a multiple-machine arrangement comprising at least a first robot operated by a first controller and a second robot operated by a second controller, said method comprising the steps of:
    generating specific robot-operating data packages respectively for said first controller and said second controller, said first controller being in an initial first controller state that defines operation of said first robot by said first controller, and said second controller being in an initial second controller state that defines operation of said second robot by said second controller;
    transferring the specific robot-operating data packages respectively to the first controller and to the second controller, and downloading the transferred specific robot-operating data package respectively to said first controller and at said second controller;
    at respective points in time after said transferring of said specific robot-operating data packages, selectively activating the respective specific robot-operating data packages in said first controller and in said second controller;
    in each of said first and second controllers, after selectively activating the respective specific robot-operating data package therefor, automatically checking whether the respective controller, or the respective robot operated thereby, is in a current state that allows the activating of the respective specific robot-operating data package; and
    only when said checking at the respective controller indicates said selective activating is allowed for both of said first and second controllers, copying data in the respective specific robot-operating data packages respectively into the first controller and the second controller, and thereby converting said first and second controllers at said respective points in time to an updated state in which each of said first and second controllers is updated compared to said initial first state and said initial second state, by being configured respectively to implement operation of said first and second robots according to said data in said specific robot-operating data packages.

2. A method as claimed in claim 1 comprising implementing at least one step in a computerized planning device.

3. A method as claimed in claim 1 wherein said checking comprises:
    in the respective controller, reviewing a robot-operating data package transferred thereto as to at least one characteristic of the respective robot operated by the data package, selected from the group consisting of robot identity, machine type, robot version, subsystems in the robot, peripheral apparatuses of the robot, kinematics of the robot and extensions of the robot; and
    storing the transferred data package at the controller.

4. A method as claimed in claim 3 comprising executing said at least one step in a computerized planning device.

5. A method as claimed in claim 1 comprising specifying a robot-operating data package for a specific one of said first controller and said second controller or a specific machine robot or a specific robot-implemented project or a robot-implemented specific project version.

6. A method as claimed in claim 1 comprising employing a controller, as at least one of said first controller and said second controller, selected from the group consisting of PC-based controllers and memory-programmable controllers.

7. A method as claimed in claim 1 comprising configuring at least one of said first controller and said second controller as a communication interface to relay data between the respective controller and a computerized planning device.

8. A method as claimed in claim 1 comprising transferring said specific robot-operating data packages to said first controller and said second controller in parallel via a network.

9. A method as claimed in claim 1 comprising activating said first and second controllers centrally.

10. A method as claimed in claim 1 comprising activating said first and second controllers simultaneously.

11. A method as claimed in claim 1 comprising activating said first and second controllers from a specific robot-implemented project or a specific robot-implemented project version.

12. A device to control a multiple-machine arrangement comprising at least a first robot operated by a first controller and a second robot operated by a second controller, comprising:
- a computerized system provided with specific data packages respectively for said first controller and said second controller, said first controller being in an initial first controller state that defines operation of said first robot by said first controller, and said second controller being an initial second controller state that defines operation of said second robot by said second controller;
- said computerized system being configured to transfer the specific robot-operating data packages respectively to the first controller and to the second controller, said specific robot-operating data packages then being downloaded respectively in said first controller and at said second controller;
- after said transferring of said specific data packages, in said first controller and said second controller being configured to selectively activate the respective specific robot-operating data package transferred thereto, and;
- each of said first and second controllers, after selectively activating the respective specific robot-operating data package therefor, being configured to automatically check whether the respective controller, or the respective robot operated thereby, is in a current state that allows the activating of the respective specific robot-operating data package; and
- only when said check at the respective controller indicates the selective activation, is allowed for both of said first and second controllers, said first controller and said second controller being configured to copy data in the respective robot-operating data packages respectively into the first controller and the second controller, and thereby to convert said first and second controllers at said respective points in time to an updated state in which each of said first and second controllers is updated compared to said initial first state and said initial second state by being respectively configured to implement operation of said first and second robots according to said data in said specific robot-operating data packages.

13. A non-transitory computer-readable storage medium encoded with programming instructions and being loadable into a computerized distribution network of a multiple-machine arrangement comprising at least one first robot operated by first controller and a second robot operated by a second controller, said programming instructions causing said computerized distribution system to:
- generate specific robot-operating data packages respectively for said first controller and said second controller, said first controller being in an initial first controller state that defines operation of said first robot by said first controller, and said second controller being an initial second controller state that defines operation of said second robot by said second controller;
- transfer the specific robot-operating data packages respectively to the first controller and to the second controller, and then download the specific robot-operating data packages respectively in said first controller and said second controller;
- selectively activate the respective specific robot-operating data packages in said first controller and in said second controller at respective points in time after said transferring of said specific robot-operating data packages; and
- in each of said first and second controllers, after selectively activating the respective specific robot-operating data package therefor, automatically checking whether the respective controller, or the respective robot operated thereby, is in a current state that allows the activating of the respective specific robot-operating data package; and
- only when said check at the respective controller indicates the selective activating is allowed for both of said first and second controllers, copy data in the respective robot-operating data packages respectively into the first controller and the second controller, and thereby convert each of said first and second controllers at the respective points in time to an updated state in which each of said first and second controllers is updated compared to said initial first state and said initial second state by being respectively configured to implement operation of said first and second robots according to said data in said specific robot-operating data packages.

14. A method as claimed in claim 1 comprising selectively activating the respective robot-operating data packages in said first controller and in said second controller.

15. A method as claimed in claim 1 comprising downloading data in the respective robot-operating data packages to the first controller and the second controller upon said activation, and thereby converting each of said first and second controllers to an updated state in which each of said first and second controllers is configured to implement at least one installation of at least one program and installation of at least one configuration file provided in said specific robot-operating data packages.

16. A device as claimed in claim 12 wherein said computerized system is configured to selectively activate the respective specific robot-operating data packages in said first controller and in said second controller.

17. A device as claimed in claim 12 wherein said computerized system is configured to download data in the respective robot-operating data packages to the first controller and the second controller upon said activation, and thereby to convert each of said first and second controllers to an updated state in which each of said first and second controllers is respectively configured to implement at least one of installation of at least one program and installation of at least one configuration file provided by said specific robot-operating data packages.

18. A storage medium as claimed in claim 13 wherein said programming instructions cause said computerized distribution system to selectively activate the respective robot-operating data packages in said first controller and in said second controller.

19. A storage medium as claimed in claim 13 wherein said programming instructions cause said computerized distribution system to download data in the respective robot-operating data packages to the first controller and the second controller upon said activation, and thereby convert each of said first and second controllers to an updated state in which each of said first and second controllers is respectively configured to implement at least one of installation of at least one program and installation of at least one configuration filed provided by said specific robot-operating data packages.

20. A method as claimed in claim 3 comprising:
- transitioning the controller or a robot controlled by the respective controller into a predetermined state upon said activation;
- from said respective controller, issuing a notification as to whether the activation is successful or unsuccessful;
- in the respective controller, storing state data before implementing said robot-operating data package;

in the respective controller, executing a predetermined action selected from the group consisting of an initialization, a system restart, and a system calibration, upon said activation;

informing the respective controller as to a result of activation of another controller;

deleting state data of the respective controller upon successful activation of the robot-operating data package or reestablishing a previous state of the respective controller upon unsuccessful activation of the robot-operating data package, based on the stored state data; and starting an installed program as a result of the activation.

* * * * *